United States Patent [19]

Hecht

[11] Patent Number: 5,576,532
[45] Date of Patent: Nov. 19, 1996

[54] INTERLEAVED AND INTERLACED SYNC CODES AND ADDRESS CODES FOR SELF-CLOCKING GLYPH CODES

[75] Inventor: David L. Hecht, Palo Alto, Calif.

[73] Assignee: Xerox Corporation, Stamford, Conn.

[21] Appl. No.: 368,113

[22] Filed: Jan. 3, 1995

[51] Int. Cl.⁶ .................................................. G06K 19/06
[52] U.S. Cl. .............................. 235/494; 235/456
[58] Field of Search ............................ 235/494, 456, 235/487, 454, 462

[56] References Cited

U.S. PATENT DOCUMENTS

| | | | |
|---|---|---|---|
| 5,128,525 | 7/1992 | Stearn et al. | 235/454 |
| 5,221,833 | 6/1993 | Hecht | 235/494 |
| 5,296,995 | 3/1994 | Yonezawa et al. | 235/493 X |
| 5,412,194 | 5/1995 | Melbye | 235/434 |

Primary Examiner—Donald T. Hajec
Assistant Examiner—Thien Minh Le

[57] ABSTRACT

Self-clocking glyph codes encode interleaved or interlaced codes to facilitate the partitioning and correlation of data embedded within such glyph codes.

5 Claims, 5 Drawing Sheets

```
A B A B A B A B A B A B A B A B A B
C C C C C C C C C C C C C C C C C C
C C C C C C C C C C C C C C C C C C
C C C C C C C C C C C C C C C C C C
C C C C C C C C C C C C C C C C C C
C C C C C C C C C C C C C C C C C C
C C C C C C C C C C C C C C C C C C
C C C C C C C C C C C C C C C C C C
C C C C C C C C C C C C C C C C C C
A B A B A B A B A B A B A B A B A B
C C C C C C C C C C C C C C C C C C
C C C C C C C C C C C C C C C C C C
C C C C C C C C C C C C C C C C C C
C C C C C C C C C C C C C C C C C C
C C C C C C C C C C C C C C C C C C
C C C C C C C C C C C C C C C C C C
C C C C C C C C C C C C C C C C C C
C C C C C C C C C C C C C C C C C C
A B A B A B A B A B A B A B A B A B
```

| A | B | A | B | A | B | A | B | A | B | A | B | A | B | A | B | A | B |
|---|---|---|---|---|---|---|---|---|---|---|---|---|---|---|---|---|---|
| C | C | C | C | C | C | C | C | C | C | C | C | C | C | C | C | C | C |
| C | C | C | C | C | C | C | C | C | C | C | C | C | C | C | C | C | C |
| C | C | C | C | C | C | C | C | C | C | C | C | C | C | C | C | C | C |
| C | C | C | C | C | C | C | C | C | C | C | C | C | C | C | C | C | C |
| C | C | C | C | C | C | C | C | C | C | C | C | C | C | C | C | C | C |
| C | C | C | C | C | C | C | C | C | C | C | C | C | C | C | C | C | C |
| C | C | C | C | C | C | C | C | C | C | C | C | C | C | C | C | C | C |
| C | C | C | C | C | C | C | C | C | C | C | C | C | C | C | C | C | C |
| A | B | A | B | A | B | A | B | A | B | A | B | A | B | A | B | A | B |
| C | C | C | C | C | C | C | C | C | C | C | C | C | C | C | C | C | C |
| C | C | C | C | C | C | C | C | C | C | C | C | C | C | C | C | C | C |
| C | C | C | C | C | C | C | C | C | C | C | C | C | C | C | C | C | C |
| C | C | C | C | C | C | C | C | C | C | C | C | C | C | C | C | C | C |
| C | C | C | C | C | C | C | C | C | C | C | C | C | C | C | C | C | C |
| C | C | C | C | C | C | C | C | C | C | C | C | C | C | C | C | C | C |
| C | C | C | C | C | C | C | C | C | C | C | C | C | C | C | C | C | C |
| C | C | C | C | C | C | C | C | C | C | C | C | C | C | C | C | C | C |
| A | B | A | B | A | B | A | B | A | B | A | B | A | B | A | B | A | B |

INTERLEAVED AND INTERLACED SYNC CODES AND ADDRESS CODES FOR SELF-CLOCKING GLYPH CODES

FIELD OF THE INVENTION

This invention relates to recording formats for self-clocking glyph codes and, more particularly, to recording formats that include an infrastructure of reference glyphs for encoding spatial sync, address and common labeling information that facilitates the reading and/or the interpretation of these glyph codes, without detracting from their visual homogeneity.

CROSS REFERENCES

This application is related to a concurrently filed, commonly assigned U.S. patent application of Petrie et al., which was filed under Ser. No. 08/368,125 on "Characterization of Embedded Data Blocks by Sync Frame Encoding of Distinctive Fixed Length Codes" (D/94914).

BACKGROUND OF THE INVENTION

A prior copending and commonly assigned United States patent application of Hecht et al., which was filed Dec. 22, 1993 under Ser. No. 08/172,508 on "Global Addressability of Self-Clocking Glyph Codes" (D/93689) describes address codes for specifying the relative addresses of the synchronization glyphs within a self-clocking glyph code pattern. This inventions builds on and extends this relative addressing concept. As such, the present invention is applicable to embedded data blocks in general, even though it is described hereinbelow in the context of self-clocking glyph code patterns.

As is known, self-clocking glyph codes are suitable for embedding machine readable data in images of various descriptions, but they are especially advantaged for applications that require or benefit from having the machine readable data embedded in the images in a visually unobtrusive or esthetically pleasing way. Specifically, to provide a visually homogeneous glyph pattern (i.e., a glyph pattern in which the glyphs are substantially indistinguishable from each other when viewed by the unaided eye under normal lighting conditions), all of the glyphs of a self-clocking glyph code typically are defined by symbols from the same symbol set, such as slash-like symbols that are tilted from vertical at approximately +45° and −45° to encode binary "0's" and "1's", respectively.

More generally, however, it is to be understood that a "glyph" is an "embedded data character," which is defined as being a two dimensional image symbology that has at least two graphical states for encoding the logical states ("1" and "0") of a single bit. An "embedded data block" (EDB) in turn, is a two dimensional image symbology for the storage and retrieval of data. EDBs are composed of embedded data characters; some of which are encoded to define a synchronization frame and others of which are encoded to carry user/application-specific information. A "glyph pattern" is an instance of an EDB.

SUMMARY OF THE INVENTION

In accordance with the present invention, self-clocking glyph codes encode interleaved or interlaced codes to facilitate the partitioning and correlation of data embedded within such glyph codes.

BRIEF DESCRIPTION OF THE DRAWINGS

Still further features and advantages of this invention will become apparent when the following detailed description is read in conjunction with the attached drawings, in which:

FIG. 1 illustrates a mapping linearly interleaved codes onto a self-clocking glyph code pattern;

FIG. 2 illustrates interleaved relatively prime counting number sequences;

FIG. 3 illustrates interleaved relatively prime bit sequences;

FIG. 4 illustrates a mapping of interwoven, two dimensionally Interleaved codes onto a self-clocking glyph code pattern;

FIG. 5 illustrates an interleaved mapping of interlaced codes onto a self-clocking glyph code pattern; and FIGS. 6 and 7–8 are mapping of interlaced codes onto a self-clocking glyph code pattern.

DETAILED DESCRIPTION OF THE ILLUSTRATED EMBODIMENTS

While the invention is disclosed in some detail hereinbelow with specific reference to certain illustrated embodiments, it is to be understood that there is no intent to limit it to that embodiment. On the contrary, the goal is to cover all modifications, alternatives and equivalents that fall within the spirit and scope of the invention as defined by the appended claims.

Turning now to the drawings, and at this point especially to FIG. 1, there is a glyph code pattern which encodes a pair of linearly interleaved sync/addressing codes A and B, together with variable data C. Typically, the variable data C is user data. On the other hand, the interleaved sync/addressing codes A and B facilitate the identification and/or the interpretation of the glyph code pattern.

A useful application for the one dimensional interleaving of the codes A and B is to facilitate the rapid recognition of the glyph code pattern from a local or isolated patch of the glyph code (such as from a fragment that happens to have been captured, or even from a fragment of a damaged code pattern) and to then correlate that portion of the glyph code with a logical address space if a sufficiently large patch of the code to establish the correlation can be captured. To this end, A might suitably be a very short cyclic code for identifying the glyph code fragment simply and accurately, while B might suitably be an address code of sufficient length to establish unique relative addresses throughout the code pattern or even across multiple code patterns. For instance, A could encode a short sequence of "1" glyphs, while B might encode, say, a 10 bit wide maximal length PN sequence (i.e., a maximal length PN sequence from a 10-stage shift register).

Another useful application for the linearly interleaved codes A and B shown in FIG. 1 relates to the interleaving of two or more short period unique address codes (such as maximal length sequences having relatively short subsequences). The linear interleaving of such address codes, as at A and B, provides an extended addressing capacity with efficient capture of the sync of the individual short codes. For maximum addressing capacity, it is important that the sequences have lengths that are all relatively prime so that their cycles don't coincide at intervals shorter than the product of the individual periods. For example the three bit sequence S=011 can be interleaved with a 9 bit, 511 length sequence to provide 3×511=1533 unique addresses based on the combination of the local subsequence in each code. (There actually are twice as many glyph position addresses (2×1533=3066) before a combined cyclic repeat of two interleaved codes since there is a distinct local position address associated with each local subset of glyphs.) FIG. 2 shows the cyclic behavior of two conveniently short (for illustration) interlaced periodic sequence codes. The numbers represent bit positions in code of sequence lengths 3 and 4 (the bit positions corresponding to the 4 element long sequence are shown in bold) which correspond to the Barker code sequences 110 and 1101 (see FIG. 3). The interlaced sequence has a repeat cycle of 3×4 pairs=3×4×2 bits (or glyphs—assuming one bit per glyph). Note that the address can be computed from the component cycle addresses via the Chinese Remainder Method.

As a general rule, in an interleaved code pattern of the type shown at A and B in FIG. 1, at least one of the codes is preferably a synchronization code for establishing and/or verifying logical ordering and partitioning, and interpretation of the glyphs. Then if every mth glyph along the line, where m is an integer, is encoded in accordance with a given one of the codes A or B, the decoding of every mth glyph includes either all members of the periodic subset of the given code or no members. This is particularly useful in establishing synchronization. As will be understood, in the sequences ABABAB, ADDADDADD, the components A and B are interlaced with mth order individual bit periodicity, but the individual components D do not have mth order individual bit periodicity.

Typically, it is advantageous to enable the interleaved glyphs to appear visually homogeneous under ordinary viewing conditions. For this reason, the glyphs within a given glyph code pattern usually are all of similar size and shape, and the center-to-center spacing between them ordinarily is essentially constant. Of course, the same glyph symbols may represent different data values in different glyph codes or may even represent different numbers of bits (e.g., some glyph code patterns may be composed of glyphs that have four distinctive rotational orientations for the encoding of two bits in each of the glyphs). Nevertheless, if desired, visually distinctive glyph code patterns and textures may be purposefully obtained by interleaving distinct glyph shapes, glyph sizes, and or glyph tiling patterns. Indeed, these distinctive visible can be employed to facilitate distinguishing among interleaved encodings during reading/decoding of the code pattern (or just certain of the encodings that it contains).

FIG. 3 shows an example of a two dimensional interleaving, where two linearly running encodings, A and B, are interwoven to cross without interference from any common glyph member at their intersection. This enables the encoding of completely independent digital values as codes A and B. Here, for example the codes A and B could each be any sequence from any two address codes. Note that there is great flexibility in choosing the rows and columns on which the interwoven line codes are positioned. In this case, a horizontal interval of 8 glyphs and a vertical interval of 9 glyphs between interleaved code line is illustrated.

As will be appreciated, once synchronization is established, one of the interleaved codes may optionally be read out to the exclusion of the other by decoding only the glyphs that encode the selected code while skipping the other glyphs.

Figures 4, 5:
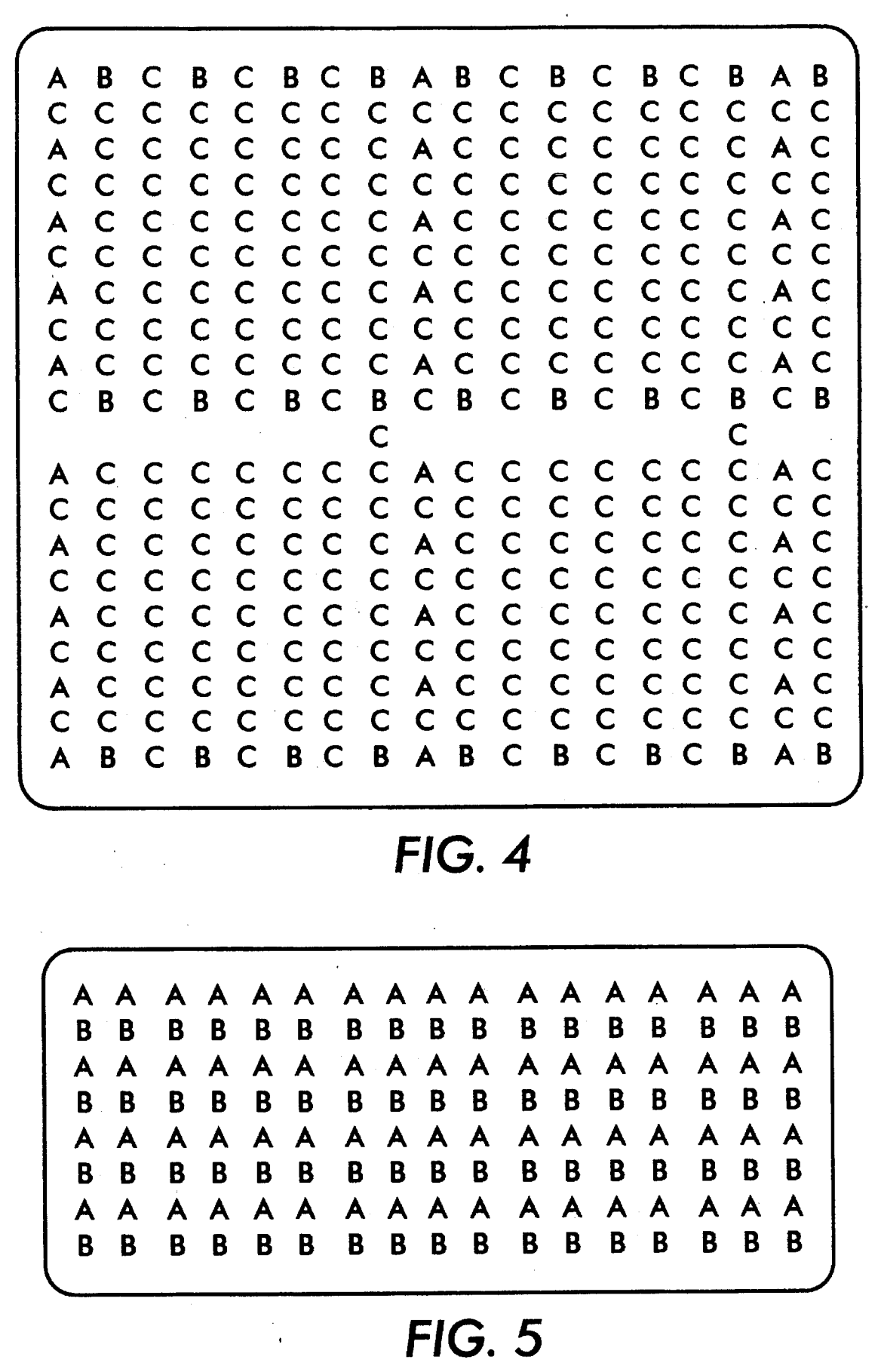
Figure 6:
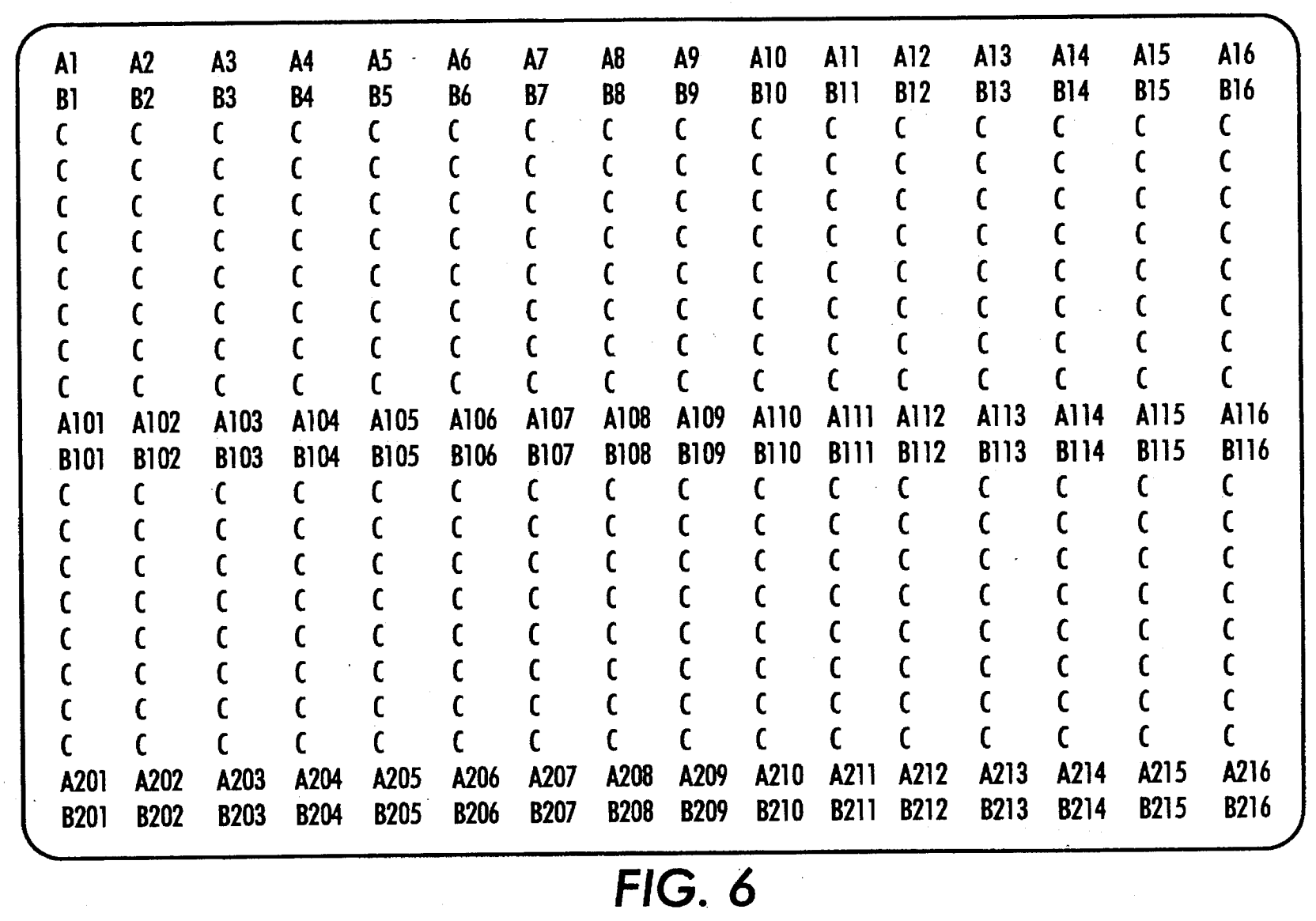

Glyph code Interlaced glyph code interleave parallel linear subarrays. FIG. 5 shows a mapping of two interlaced codes A and B into a glyph code pattern such that the codes A and B are encoded by interleaved parallel linear subarrays of glyphs. FIG. 6 shows interlaced encodings of two codes A and B, together with an interlaced encoding of a third component C, such as user data. As will be apparent, interlace is particularly advantageous when one or more of the codes is a sequence of data whose interpretation is correlated to spatial position along the linear pattern code, as in synchronization and address codes. The self-clocking property of these glyph codes is an associative property that links physically neighboring glyphs in parallel linear arrays to each other. Therefore interlace can be used to encode sequences whose mutual association is critical, as in multiple components of (relative prime factor sequence) compound synchronization codes discussed above.

Figures 7, 8:
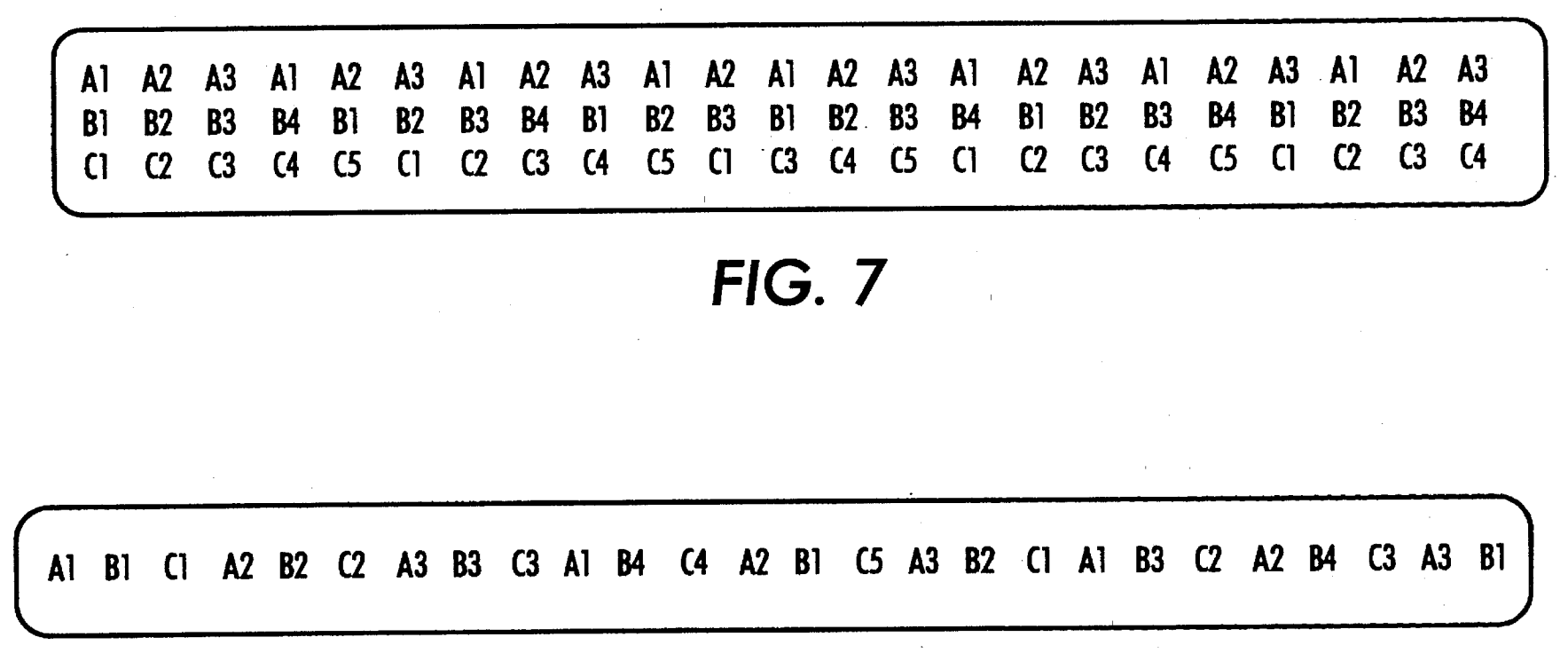

Advantages of the interlace approach include: (1) each code can be read as a continuous string of neighboring glyphs; (2) there may be less chance of confusing A, B than in sequential interleaving; (3) the linear spatial format of each code is not dependent on how many other interlaced codes are involved; (4) the interlace approach allows compaction of a long interleaved addressing code into a shorter region. This compaction can facilitate printing in an available space and/or input scanning of an adequate data field with a limited image field device such as a small area array detectors. In FIG. 7, a three component cyclic address code is reduced to a three times shorter space interlaced code compared to a linear pattern interleave as shown in FIG. 8 (the common member printed in FIGS. 7 and 8 are shown in bold).

What is claimed:

1. A process for constructing an embedded data structure on a recording medium, said process comprising the steps of
   encoding a first predetermined code in a first set of embedded data characters,
   encoding a second predetermined code in a second set of embedded data characters and
   writing said first set and said second set of embedded data characters on said recording medium in a spatially interleaved relationship with respect to each other.

2. The process of claim 1 wherein
   said first code is a relatively cyclic short cyclic code, and
   said second code is a longer address code.

3. The process of claim 1 wherein said first and second codes are cyclic sequences having relatively prime cycle lengths.

4. A process for constructing an embedded data structure on a recording medium, said process comprising the steps of
   encoding a first predetermined code in a first set of embedded data characters,
   encoding a second predetermined code in a second set of embedded data characters and
   writing said first set and said second set of embedded data characters on said recording medium in a spatially interlaced relationship with respect to each other.

5. The process of claim 4 wherein said first and second codes are cyclic sequences having relatively prime cycle lengths.

* * * * *